United States Patent [19]

Steyert, Jr. et al.

[11] 4,033,734
[45] July 5, 1977

[54] CONTINUOUS, NONCYCLIC MAGNETIC REFRIGERATOR AND METHOD

[76] Inventors: William A. Steyert, Jr., 1442 - 47th St.; Stephen S. Rosenblum, 641-A - 43rd St., both of Los Alamos, N. Mex. 87544

[22] Filed: Sept. 17, 1976

[21] Appl. No.: 724,404

[52] U.S. Cl. .................................. 62/3; 62/467 R
[51] Int. Cl.² ...................................... F25B 21/02
[58] Field of Search ........................... 62/3, 467

[56] References Cited

UNITED STATES PATENTS

| | | | |
|---|---|---|---|
| 3,004,393 | 10/1961 | Alsing | 62/3 |
| 3,108,444 | 10/1963 | Kahn | 62/3 |
| 3,192,727 | 7/1965 | Ashby et al. | 62/3 |
| 3,315,490 | 4/1967 | Berry et al. | 62/467 |
| 3,393,526 | 7/1968 | Pearl | 62/3 |
| 3,413,814 | 12/1968 | Van Geuns | 62/467 |
| 3,599,437 | 8/1971 | Panas | 62/3 |
| 3,638,440 | 2/1972 | Lawless | 62/3 |
| 3,743,866 | 7/1973 | Pirc | 62/3 |
| 3,992,893 | 11/1976 | Claudet et al. | 62/467 |

*Primary Examiner*—Lloyd L. King
*Attorney, Agent, or Firm*—Paul D. Gaetjens

[57] ABSTRACT

A continuous, noncyclic magnetic refrigerator consisting of a liquid nitrogen cryostat having a motor-driven wheel with a pressed, porous rare earth compound as a rim that rotates through two thermally separated inner reservoirs of liquid helium, the first reservoir being at an elevated temperature relative to the second reservoir, two superconducting magnets of different field strengths, the larger of which is situate in the first reservoir and is adjacent to the said rim while the smaller magnet is positioned in the second reservoir adjacent to said rim, and said reservoir or reservoirs having a convection-driver pump to increase circulation of the helium in said second or first and second reservoirs through said porous rim.

8 Claims, 4 Drawing Figures

CONTINUOUS, NONCYCLIC MAGNETIC REFRIGERATOR AND METHOD

BACKGROUND OF THE INVENTION

1. Field of the Invention

This invention is concerned with a method and apparatus which allows continuous, noncyclic refrigeration. In particular, the method and apparatus involves moving paramagnetic material, which is situate on the rim of a wheel, through a magnetic field. The paramagnetic material moves through the field, and heat is expelled into a hot thermal reservoir. As the paramagnetic material moves into an area containing the substance to be refrigerated or cooled, the magnetic field applied to the paramagnetic material is decreased, thus causing the material to cool. The magnetic field is tailored such that, as the paramagnetic material enters or comes in contact with the substance to be refrigerated, it is at the temperature of this substance. As it moves through the substance, either gas or liquid, the magnetic field is further decreased and the paramagnetic material continues to cool to slightly below the temperature of the substance being refrigerated, thus causing this substance to cool. When the paramagnetic material leaves the substance that is being refrigerated and again reenters the hot thermal reservoir area, the magnetic field is increased and the paramagnetic material heats up until it reaches the region of the most intense field, whereupon the paramagnetic material transfers the heat acquired from the substance that is being refrigerated and expels it into the hot thermal reservoir.

2. Description of the Prior Art

U.S. Pat. No. 3,413,814, J. R. Van Geuns, is directed to a method and apparatus for refrigeration in which the entropy of a paramagnetic substance is alternately varied by varying the external parameter such as a magnetic field and a fluid medium such as helium gas is flowed in alternate directions in heat exchanger relationship with the substance. During the directional flows, heat and cold are transferred from the substance to the fluid and corresponding to these flows there is a heat exchanger relationship, first by the portion of the fluid with an area absorbing heat from the fluid, and subsequently by a remote portion of the fluid with an area to be cooled. Fluid in the first area is at a generally higher temperature than fluid in the area to be cooled, and portions of fluid in the two areas are not intermixed. This invention is directed to a rotating wheel design and moves the working substance that is the paramagnetic material between the reservoirs, i.e., the hot thermal reservoir and the reservoir containing the substance to be cooled, while keeping all other parameters constant. The Van Geuns patent uses a regenerator and reverses the direction of gas flow, while the apparatus of this invention needs no regenerator, nor does it rely on heat exchangers to transfer heat from the medium to the respective reservoirs, nor does it require a directed flow of fluids. Applicants' method and apparatus are particularly concerned with the mass transport of medium directly through a porous working material.

U.S. Pat. No. 3,108,444, D. Kahn. The Kahn patent is directed to a refrigerator apparatus capable of producing temperature of the order of 4° K and is a magnetocaloric cryogenic refrigerator consisting of a pair of spaced, thermally isolated heat reservoirs, a material having superconducting properties moving between said reservoirs with said material being physically separated but in thermal contact with said reservoirs, subjecting a portion of this material to a magnetic field of critical field intensity, and effecting progressive relative movement between the material and the magnetic field to cause a net heat transfer from one reservoir to the other. The Kahn patent uses superconductors as the working material, whereas this invention uses a paramagnetic material. The use of superconductors as a working material causes limitations on the ability of the Kahn device to remove heat quickly. The reasons for this are that the entropy removable by a magnetic field per unit volume from the superconductors is 1 to 2 orders of magnitude smaller than from a paramagnet. Further, the rotation rate of the Kahn wheel using a superconductor is severely limited by eddy current and hysteresis losses. The apparatus of this invention uses an insulator as a working material and therefore the rotation rate of the wheel is not subject to the aforementioned limitation. Furthermore, the Kahn device and method does not shape the magnetic field so that it goes to zero in a graduated manner and therefore does not make use of the Carnot cycle, thus lowering its efficiency. In addition, the Kahn device separates the wheel from the high and low temperature reservoir by a metal membrane. This structure leads to poor heat transport between the working material and the reservoirs. In the device of the present invention the reservoir fluid saturates and travels through the porous working material that carries the heat away by means of mass transport. Thus, the device of this invention has of the order of 100 times more cooling power than the Kahn device.

UTILITY

The need for reliable and efficient cryogenic refrigeration is due to the projected increasing use of superconductors in electrical devices. Devices using such materials can carry large amounts of current with no ohmic loss but must operate in an environment of very low temperatures, namely, below 20° K. In order to achieve temperatures in the region below 20° K, cryogenic refrigerators must be used to keep the cooling fluid at these very low temperatures.

SUMMARY OF THE INVENTION

An apparatus and method useful in cooling in the region below 20° K employing a continuous, noncyclic magnetic refrigerator, said refrigerator consisting of a wheel having a rim made of a paramagnetic material such as gadolinium sulfate octahydrate, a heat source reservoir containing material to be cooled or refrigerated, a thermal barrier separating said heat source from a heat sink reservoir, both heat source and heat sink reservoirs being contained in a liquid nitrogen cryostat vessel having several superconducting magnets whereby the paramagnetic material contained on the rim of the wheel moves through the heat source reservoir and extracts a quantity of heat and expels said heat into the heat sink reservoir and the said magnets varying the intensity of the field applied so that when the paramagnetic material enters the heat source reservoir the field decreases and then the field increases when the paramagnetic material enters the heat sink reservoir.

DESCRIPTION OF THE PREFERRED EMBODIMENT

Figure 1:
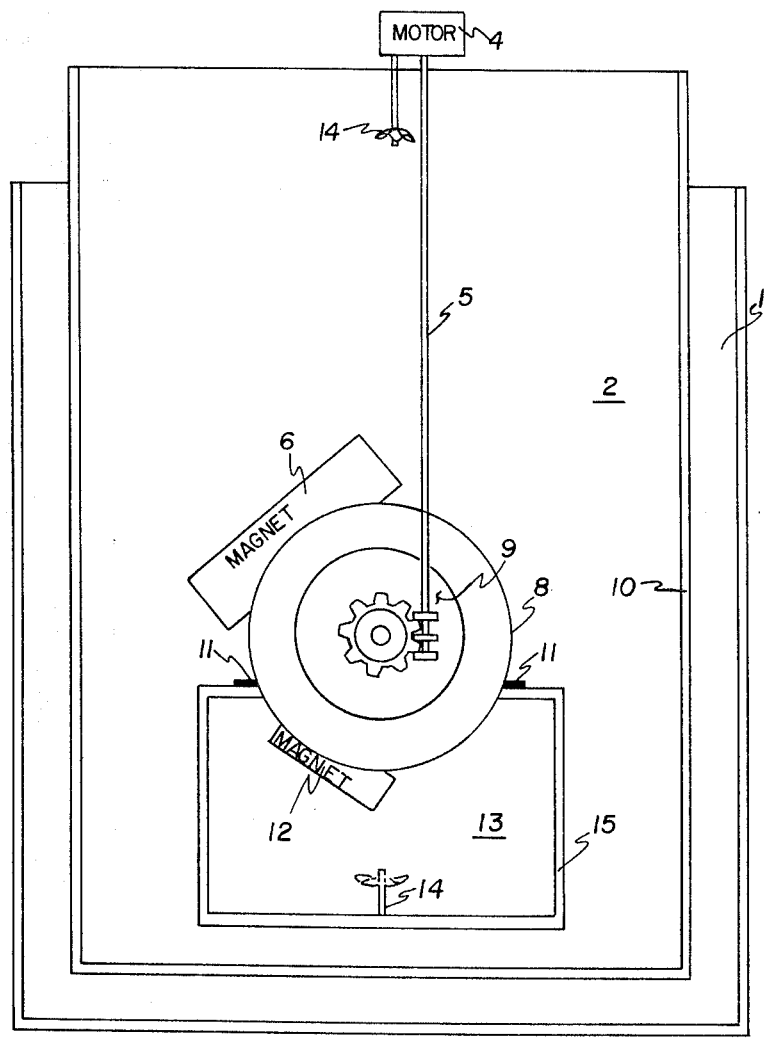
FIG. 1 is a schematic drawing of the preferred embodiment of this invention showing the cryogenic refrigerator system.

Referring generally to the embodiment illustrated in FIG. 1, a continuous, noncyclic magnetic refrigerator is schematically shown consisting of a liquid nitrogen cryostat 1 having a motordriven wheel 9 with motor driving means 4 and 5. Pressed porous rare earth compound rim 8 of wheel 9 rotates through two inner reservoirs of liquid helium thermally separated by insulation 11, the first reservoir 2 being a heat sink and at an elevated temperature relative to the second reservoir 13, two superconducting magnets of different field strengths, the larger 6 is situate in the first reservoir 2 and is adjacent to the said rim 8 while the smaller magnet 12 is positioned in the second reservoir 13 adjacent to the said rim 8, and said heat source reservoir optionally having a convection-driver pump 14 to increase circulation of the helium in said second reservoir through said porous rim 8. A similar convection-driver pump 14 could be utilized in the first reservoir 2 as well.

Figure 2:
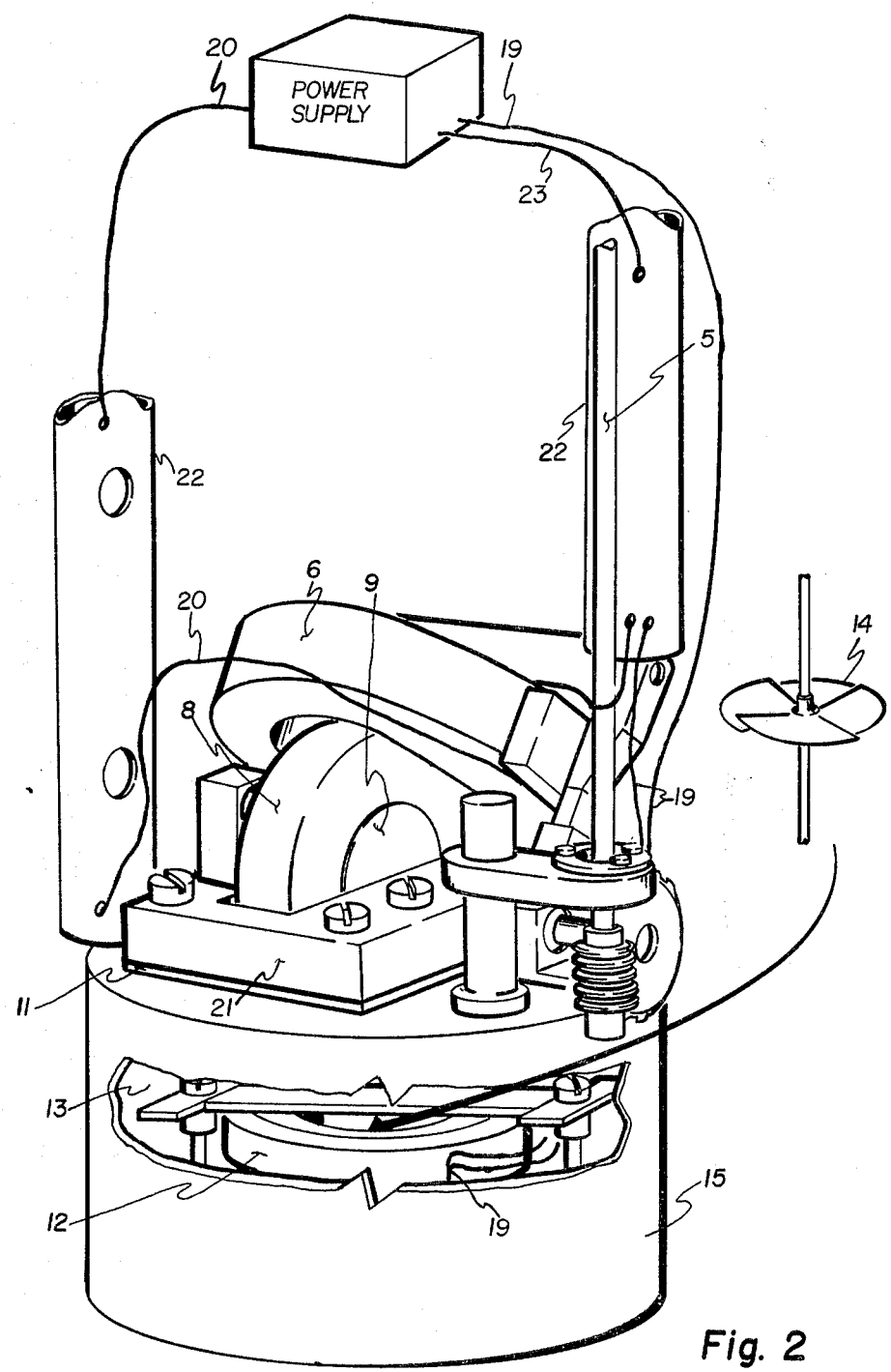
FIG. 2 is a perspective drawing of the preferred embodiment with the power supply for the superconducting magnets being shown schematically.

As shown in FIG. 2, a pressed powder of gadolinium sulfate octahydrate forms the rim 8 of the motor-driven wheel 9. The heat source reservoir 13 consists of the object to be cooled, and a liquid cryogen which acts as the heat exchange medium, and is contained in a vacuum walled vessel 15 on which the wheel bearings and magnets 6 and 12 are mounted. The seals 11 are 0.002-in.-thick teflon sheets which make a wiping contact with the wheel. These seals could also consist of alternate layers of teflon and thin phosphor-bronze or phosphor-bronze alone. The heat reservoir 2 consists of liquid helium at its normal boiling point 4° K. Immediately surrounding the wheel in the heat reservoir is a batting 21 consisting of hard cotton felt to reduce stirring of the bath in the immediate vicinity of the rotating wheel 9. The main magnet 6 and the compensating magnet 12 have windings made of superconducting niobium-titanium composite wire which produces a magnetic field of about 0.6 T in magnet 12 and a field of about 3.2 T in magnet 6. Electric energy is furnished to magnets 6 and 12 by an appropriate power supply and wires 19, 20, current return 23, and brass, vapor cooled busses 22. The connections to the power supply, 19, 20, and 23 (shown schematically) are all at room temperature.

Figure 3:
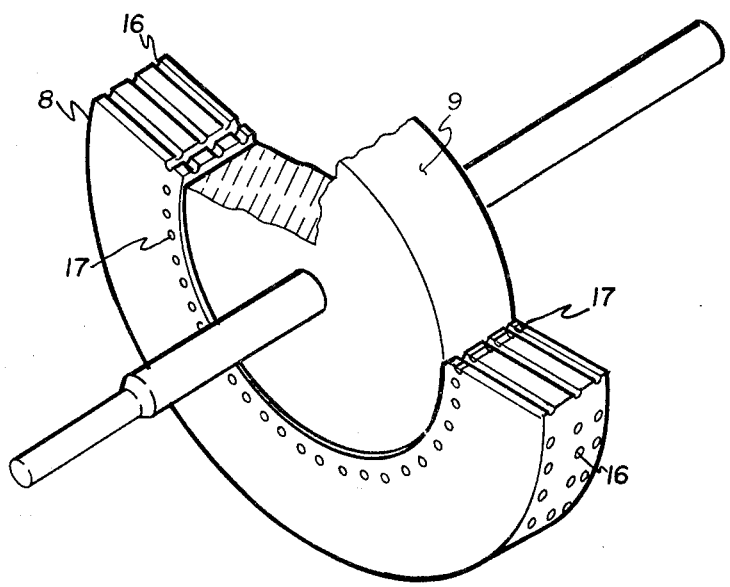
FIG. 3 is a sectional drawing of the porous wheel and further showing drilled channels both axially and radially through the rim of said wheel.
Figure 4:
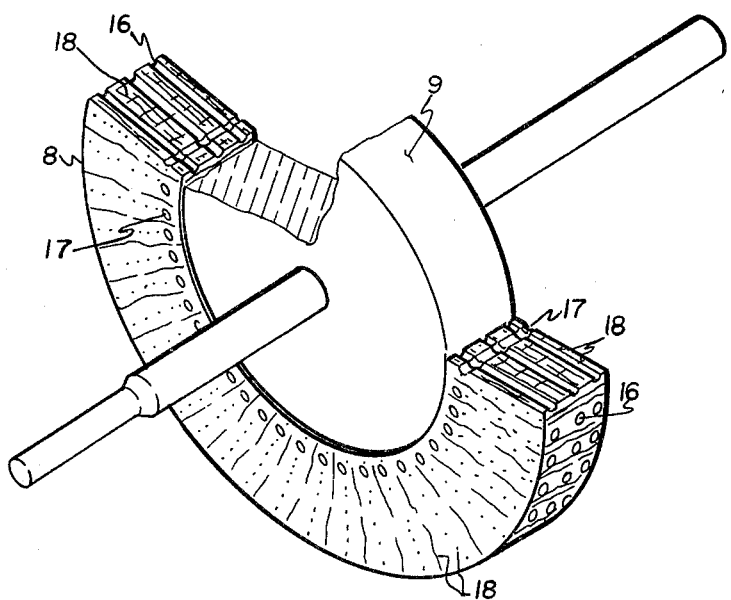
FIG. 4 is a sectional drawing of the wheel showing a combination of axially and radially drilled channels with the addition of radially embedded copper fibers.

As shown in FIGS. 3 and 4, the surface area of the porous rim portion 8 of the wheel 9 is increased by the drilling of many small holes or channels 16 through the rim in a direction parallel to the axis. In addition channels 17 are also drilled through the rim of the wheel radially to the axis which intersect the parallel channels 16. These channels increase flow of liquid cryogen through the rim 8 thus increasing intimate contact with the rare earth working material, gadolinium sulfate octahydrate. Specifically, FIG. 4 shows the addition of a further improvement to increase thermal conductivity through the working material by the insertion of small copper fibers 18 in directions both radial and parallel to the axis so that heat would only travel a short distance in the poorly conducting gadolinium sulfate octahydrate before it came in contact with the high thermal conducting copper fiber 18. The number and the amount of copper fibers should be at least 10 volume percent of 0.003-in.-diameter copper wires embedded in the gadolinium sulfate octahydrate. Said fibers must be oriented parallel to or radial to the wheel axis and would improve thermal conductivity by one order of magnitude. In addition, the helium fluid that is being cooled 13 may be forced to circulate through the porous gadolinium sulfate octahydrate rim when it is in vessel 15 by means of pump 14.

The most important and essential requirements for a working material to form the rim of the wheel are contained in the following equation:

$$S_{TOT} = S_o \left[ 1 + \frac{\Delta S_m}{S_o} \right]$$

where $S_{TOT}$ = total entropy of material
$\Delta S_m$ = entropy associated with the orientation of the magnetic spins in an applied magnetic field
$S_o$ = entropy associated with all other processes (e.g., lattice vibrations, crystalline field effects).

The requirement is that $\Delta S_m/S_o$ be as large as possible. $\Delta S_m$ can be given by $$\Delta S_m = \frac{-p_{eff}^2 \beta^2 H^2}{6k^2 T^2}$$

where $p_{eff}$ = effective magnetic moment
$\beta$ = Bohr magneton
$H$ = applied field (Tesla)
$k$ = Boltzmann's constant
$T$ = absolute temperature Aside from being rugged, stable, etc., the material should also not order antiferromagnetically above the lowest temperature of interest.

OPERATIONS

As the rim 8 moves counterclockwise through the highest values of the magnetic field formed by main magnet 6, heat is expelled from the rim into heat sink reservoir 2 through the boiling of the liquid helium which makes up this reservoir. As the wheel moves down towards the liquid to be cooled, the heat source reservoir 13, the magnetic field decreases due to the placement of magnets 6 and 12 thus cooling the paramagnetic rim 8. Batting 21 and seal means 11 prevent convective heat transfer which could be caused when the wheel moves through the heat sink reservoir 2. The magnetic field is tailored by compensating magnet 12 to be such that as the rim enters the fluid to be cooled 13, it is at this fluid's temperature. As the rim 8 moves through the fluid to be cooled, the magnetic field decreases to zero and the rim 8 continues to cool to slightly below the temperature of the heat reservoir 13, thereby absorbing heat from the heat source. When the rim 8 leaves the heat source reservoir and enters the heat sink reservoir 2, the magnetic field increases and the rim heats up until it gets into the region of the most intense magnetic field, namely, its furthest insertion into main magnet 6 where it then transfers or expels the heat picked up from the heat source reservoir 13 to the heat sink reservoir 2 by boiling the liquid helium which makes up the heat sink reservoir 2. The microscopic porosity of the rim without channels is of the order of a few percent, i.e., less than 10 percent. An essential feature of the device and its operation is the intimate contact between working material and the reservoir fluids due to the flow of fluid through the porous working material (rim).

An important feature of the heat sink reservoir 2 is that 20 volume percent $^3$He may be added to the $^4$He reservoir or 20 atmospheres of pressure may be impressed on the $^4$He fluid to minimize the heat leak across the seals when operating below 2.17 K, the normal λ point of $^4$He. The addition of $^3$He or application of pressure depresses the λ point to just above the temperature of the heat source reservoir, 1.85° K in this particular situation, thus allowing use of the extremely high thermal conduction of the superfluid He between the heat source reservoir 13 and the working material of rim 8 at these lower temperatures.

The following table lists various embodiments which use the device and method described in the preferred embodiment.

The requirements for the selection of a material for use in a particular temperature range are as follows:

1. It should have a small electronic and lattice specific heat, or else a large amount of capacity will be lost in cycling any refrigerant temperature in some refrigerator designs.

2. Any antiferromagnetic ordering temperature should be below the heat source reservoir temperature as it is difficult to self-cool a material very much below its Neel temperature.

3. The application of a modest magnetic field forces a large amount of heat out of the working material. This is achieved by choosing a paramagnetic material with a large magnetic moment or a paramagnetic material which also has a ferromagnetic Curie point just below or in the temperature of interest.

Table

| Working Material | Preferred Embodiment Porous Gd$_2$(SO$_4$)$_3$ · 8H$_2$O | Porous Dy$_2$Ti$_2$O$_7$ | Porous Gd metal |
|---|---|---|---|
| Temperature range | 4 K and below | 20 K to 4 K | 300 K to 270 K |
| Reservoir fluids | Liquid $^4$He, λ point, depressed by pressure or $^3$He addition | Gaseous He under about 20 atm pressure plus liquid $^4$He or liquid H$_2$ and liquid $^1$He | Water plus ethylene glycol or sodium-potassium liquid alloy |
| Seal material | Teflon and phosphor-bronze | Differentially pumped seal region | Teflon |
| Magnets | Multifilamentary Nb-Ti copper composite and superconductor - 2 T to 5 T magnetic field is required | Multifilamentary Nb$_3$Sn copper composite superconductor - 5 T to 10 T magnetic field is required | Alnico permanent magnet, superconducting magnet. The higher the magnetic field, the better the performance |

From the foregoing it will be evident that the invention provides an improved device and method for producing cold in a continuous process, using the mass transport effect. This magnetic refrigerator will operate to cool helium from 14° K to 1.8° K at an expected 70% of Carnot efficiency providing up to 5 kW of refrigeration.

What we claim is:

1. A continuous, noncyclic magnetic refrigerator consisting of a liquid nitrogen cryostat having a motor-driven wheel with a pressed, porous rare earth compound as a rim that rotates through two thermally separated inner reservoirs of liquid cryogen, the first reservoir being at an elevated temperature relative to the second reservoir, two superconducting magnets of different field strengths, the larger of which is situate in the first reservoir and is adjacent to the said rim while the smaller magnet is positioned in the second reservoir adjacent to the said rim.

2. The refrigerator of claim 1 wherein said liquid cryogen consists of one of the following: $^4$He, a mixture of $^3$He and $^4$He, gaseous $^4$He under 20 atmospheres of pressure plus liquid $^4$He, or a combination of liquid H$_2$ and $^4$He reservoirs.

3. The refrigerator of claim 1 wherein the said two inner reservoirs each have a convection-driver pump to increase circulation of the liquid cryogen through the said porous rim.

4. The refrigerator of claim 1 in which the said porous rare earth compound is selected from the class consisting of Gd$_2$(SO$_4$).8H$_2$O, Dy$_2$Ti$_2$O$_7$, and porous gadolinium metal, and the porosity is in the range of 3 to 10 volume percent.

5. The refrigerator of claim 1 wherein the said rim is made more porous by the drilling of multiple channels through the rim in a direction both radial and parallel to the axis of said wheel.

6. The refrigerator of claim 5 wherein thermal conductivity in increased in said rim by the addition of 10 volume percent copper fibers which are oriented parallel to the said channels in the said rim.

7. The method for high capacity, magnetic refrigeration utilizing mass transport effect, said method comprising rotating a wheel having a microscopically porous rim made of paramagnetic material through a heat source reservoir, a thermal barrier separating said heat source reservoir from a heat sink reservoir, both heat source reservoir and heat sink reservoir being contained in a liquid nitrogen cryostat vessel containing at least two superconducting magnets whereby the paramagnetic material contained on the rim of the wheel moves through the heat source reservoir and extracts a quantity of heat and expels said heat into the heat sink reservoir, said extraction and expulsion being caused by varying the intensity of the magnetic fields of said magnets such that the field applied to the paramagnetic material decreases when it enters the heat source reservoir and increases when the paramagnetic material enters the heat sink reservoir.

8. The method of claim 7 wherein the intensity of the magnetic field of the heat sink reservoir is at least a factor of 4 greater than the field of the heat source reservoir.

* * * * *